United States Patent [19]
Yoshikawa

[11] Patent Number: 4,748,213
[45] Date of Patent: May 31, 1988

[54] ALL-AROMATIC POLYESTER RESIN COMPOSITION

[75] Inventor: Masao Yoshikawa, Gifu, Japan

[73] Assignee: NTN-Rulon Industries Co., Ltd., Tokyo, Japan

[21] Appl. No.: 60,886

[22] Filed: Jun. 12, 1987

[30] Foreign Application Priority Data

Jun. 14, 1986 [JP] Japan .................. 61-138941

[51] Int. Cl.$^4$ .............. C08G 65/48; C08L 67/00; C08L 71/04; C08L 77/00
[52] U.S. Cl. .................. 525/397; 525/391; 525/419; 528/179
[58] Field of Search ............. 525/391, 397, 419; 528/179

[56] References Cited

U.S. PATENT DOCUMENTS

| | | | |
|---|---|---|---|
| 3,379,792 | 4/1968 | Finholt | 525/397 |
| 4,225,686 | 9/1980 | Onder et al. | 525/419 |
| 4,315,086 | 2/1982 | Ueno et al. | 525/391 |
| 4,431,779 | 2/1984 | White et al. | 525/397 |
| 4,485,219 | 11/1984 | Falk et al. | 525/394 |

Primary Examiner—Lucille M. Phynes
Attorney, Agent, or Firm—Armstrong, Nikaido, Marmelstein & Kubovcik

[57] ABSTRACT

Improved all-aromatic polyester resin compositions are proposed which comprise an all-aromatic polyester resin and a polyether oil. They have excellent moldability and shock resistance while retaining good heat resistance.

1 Claim, No Drawings

ALL-AROMATIC POLYESTER RESIN COMPOSITION

BACKGROUND OF THE INVENTION

The present invention relates to all-aromatic polyester resin compositions.

All-aromatic polyester resins have excellent heat resistance as well as good resistance to chemical, oil and radiation and good insulating properties and are injection moldable. So their use is increasing in wider fields, especially for electric or electronic components. But, the moldings of all-aromatic polyester resin tend to warp or crack because of high temperature for injection molding, its flow characteristics susceptible to the molding temperature, and its high tendency to orientation. Also the moldings have been thought to be not suitable for practical applications to structural materials because of their poor impact strength.

A number of attempts have been made to obviate such shortcomings of all-aromatic polyester resins. In order to improve its flow characteristics, blending such resins as polyethylene terephthalate or polycarbonate having good flow characteristics (or moldability), and melting and blending such resins as polyphenylene sulfide or polyether ether ketone having high heat resistance as well as good flow characteristics have been proposed. In order to improve the impact resistance of the moldings, blending rubber is one solution. However, in mixing an all-aromatic polyester resin with polyethylene terephthalate or polycarbonate, granulating and molding, if treated at a temperature which melts the all-aromatic polyester resin into a uniform structure, polyethylene terephthalate and polycarbonate are apt to heat-decompose. On the other hand, if treated at a temperature at which the resin does not heat-decompose, the flow characteristics of all-aromatic polyester resin will not be improved so sufficiently that the composition will be a uniform dispersion. Similar unfavorable results are observed in blending rubber to improve the impact strength. It was further noted that an expected decrease in the melt viscosity of an all-aromatic polyester resin was not attained by melting and blending polyphenylene sulfide or polyether ether ketone with the all-aromatic polyester resin. Besides the above methods, it is thought that introducing an aliphatic group such as ethylene glycol as a soft segment into the molecular structure to modify the properties of the all-aromatic polyester resin itself to lessen its cohesiveness would improve the flow characteristics and decrease the anisotropy. But this method is in no way favorable because it deteriorates drastically the heat resistance of the all-aromatic polyester resin.

SUMMARY OF THE INVENTION

An object of the present invention is to provide an all-aromatic polyester resin composition which has excellent moldability and impact resistance while retaining high heat resistance which it originally possesses.

In accordance with the present invention, there is provided all-aromatic polyester resin compositions comprising an all-aromatic polyester resin having three repeated elements of the following formulas as the main structural units:

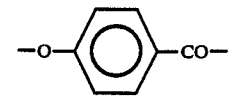

   (n = 0 or 1)

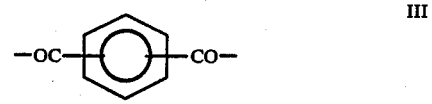

and a polyether oil.

DETAILED DESCRIPTION OF THE PREFERRED EMBODIMENT

Among the repeated elements constituting the main structural units of the all-aromatic polyester resin used in the present invention, the following is the most preferable as the elements of Formula II

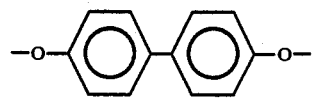

and the following is the most preferable as the elements of Formula III

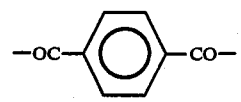

in order to obtain a composition having good heat resistance and melting properties.

The polyether oil used according to the present invention may be a substance having a basic structure in which benzene nuclei are linked together by at least one of ether linkage (—O—) and thioether linkage (—S—). As one example of such substances, polyphenyl ether oil OS124 produced by Monsanto Company in USA can be named. It is polyphenyl ether oil having structural isomers comprising benzene nuclei linked by ether linkages.

In blending the polyether oil into the all-aromatic polyester resin, the content of polyether oil should be 3.0–0.05 wt %. If over 3.0 wt %, the impact resistance of the resulting resin will decrease because the polyether oil functions as an internal lubricant. If less than 0.05 wt %, a substantial decrease in the melt viscosity and an improvement in the moldability cannot be expected, and the impact resistance of the molding is not improved sufficiently.

In mixing the polyether oil with all-aromatic polyester resin, these materials may be separately fed to a melt-mixing machine, or blended together with such a general-purpose mixer as a Henschel mixer, a ball mixer or a ribbon blender and then fed to a melt-mixing machine.

Also the following agents may be added as necessary within the range not ruining the objects of this invention: antioxidant, heat stabilizer, ultraviolet light absorber, lubricant, parting agent, dye, colorant, fire retardant, fire retardant assistant, and antistatic agent, which are usually added to ordinary resin compositions, as well as abrasion resistance improver (such as graphite, carborundum, fluorite powder, molybdenum disulfide and fluorine resin), reinforcer (such as glass fiber, carbon fiber, boron fiber, silicon carbide fiber, carbon whisker, asbestos fiber and rock wool and metallic fiber), trucking resistance improver (such as silica and graphite) and other fillers (such as glass beads, glass balloon, calcium carbonate, alumina, talc, diatom earth, clay, kaolin, plaster, calcium sulfite, mica, metallic oxide, and inorganic pigments, which are stable at a temperature of 300° C. or over).

The polyester oil blended in the all-aromatic polyester resin is supposed to enhance the inherent orientation property of the all-aromatic polyester resin and allow it to display its self-reinforcing property, improving its impact resistance.

EXAMPLES 1-3

The all-aromatic polyester resin comprising three repeated units as shown below [XYDAR-SRT500 or SRT300 made by DARCO Corp. in U.S.A.] and a polyphenyl ether oil [OS-124 made by Monsanto Company] were mixed in the ratios shown in Table 1 and dry blended. The mixture was extruded by a twin-screw extruder at a temperature of 370°–400° C. to granulate. The pellets obtained were fed to an injection molding machine (cylinder temperature: 360°–390° C., injection pressure: 1000 kg/cm$^2$ and mold temperature: 100°–150° C.) to mold into test pieces having required shapes. Then, the Izod impact strength (under ASTM-D256), bending strength, bending elasticity modulus (under ASTM-D790) and melt viscosity (using a Brabender viscometer, at 390° C., rotor: 60 r.p.m) of the test pieces were measured. The results are shown in Table 1.

COMPARATIVE EXAMPLES 1-4

Test pieces were made in the same manner as Example 1 except that only the all-aromatic polyester resin was used or the polyether oil was blended in the amount beyond the range defined by the present invention, and their characteristics were evaluated.

The blending proportion and the measurements are shown in Table 1. The measurements for the Comparative Examples 1-4 were not satisfactory which showed extremely high melt viscosity or considerably lower impact strength even though the melt viscosity was almost equal to the measurements for the Examples 1-3.

COMPARATIVE EXAMPLES 5-10

Test pieces were made in the same manner as Example 1 except that the lubricating materials shown in Table 2 were blended in place of polyether oil, and their characteristics were measured. The following lubricating materials were used: ethylene tetrafluoride resin powder [made by Kitamura K.K.: KTL610], fluorinated polyether oil [made by Montefluos Corp. in Italy: FOMBLIN-Z25], silicone oil [made by Toshiba Silicone K.K.: TSF 433] and zinc stearate [reagent, first class]. The measuring results obtained are shown in Table 2.

COMPARATIVE EXAMPLES 11-16

Test pieces were made in the same manner as Example 1 except that the lubricating materials shown in Table 3 were used instead of polyether oil, and their characteristics were evaluated. The following lubricating materials were used: Polyether ether ketone [made by I.C.I. Corp. in U.K.: Udel-PEEK], polyether imide [made by G.E. Corp. of U.S.A.: Ultem 1000], polyether sulfone [made by I.C.I. Corp, of U.K.: 300P], polyphenylene sulfide [made by Phillips Petroleum Corp. of U.S.A.: RYTON P-4] and ethylene tetrafluoride perfluoroalkyl vinyl ether copolymer resin [made by Mitsui Dupon Florochemical Co. 340J]. The results obtained are also listed in Table 3.

Comparison of the results of Comparative Examples 5-16 (in Tables 2 and 3) with the results of Examples 1-3 (Table 1) shows that in Comparative Examples 6 and 12 in which a resin was added as an interier lubricant and an improver, the impact strength was low though the melt viscosity of the composition dropped. In Comparative examples 5, 7, 8, 11, 13, 14 and 15, no decrease in the melt viscosity was observed and the impact strength remained low. In Comparative Examples 9 and 10 in which silicone oil and zinc stearate were added, respectively, the mechanical strength decreased and the heat decomposition caused browning. After all, it is apparent that no effect as expected was produced.

As described above, the all-aromatic polyester resin composition in accordance with the present invention has excellent moldability and impact resistance while retaining the inherent heat resistance. The composition molded into the form of film sheet, fiber and so forth can be widely used as parts or components of electronic or electric apparatus, aviation-space equipment, general equipment, chemical equipment, equipment for manufacturing integrated circuits (IC sockets, sleeves, wafer baskets, etc.), and as covering materials for optical fiber and the like, that is, in fields where all-aromatic polyester resins have not been used so far.

TABLE 1

|  | Example | | | Comparative example | | | |
|---|---|---|---|---|---|---|---|
|  | 1 | 2 | 3 | 1 | 2 | 3 | 4 |
| Composition | | | | | | | |
| XYDAR-STR300 | — | — | — | 100 | — | — | — |
| XYDAR-STR500 | 97.0 | 99.7 | 99.93 | — | 100 | 96.5 | 99.97 |
| OS-124 | 3.0 | 0.3 | 0.07 | — | — | 3.5 | 0.03 |
| Measurements | | | | | | | |
| Izod impact strength (notch) | 9.0 | 19.0 | 15.0 | 6.5 | 8.7 | 3.5 | 5.0 |
| Bending strength (kg/cm$^2$) | 1060 | 1138 | 1001 | 1008 | 979 | 1027 | 1020 |
| Bending modulus (kg/mm$^2$) | 1290 | 1510 | 1300 | 944 | 988 | 1290 | 1112 |
| Melt viscosity (kg · cm) | 75 | 70 | 81 | 225 | 215 | 78 | 152 |

TABLE 2

| No. of comparative example | 5 | 6 | 7 | 8 | 9 | 10 |
|---|---|---|---|---|---|---|
| Composition | | | | | | |
| XYDAR-STR300 | 99.5 | 97.0 | 99.5 | 97.0 | — | — |
| XYDAR-STR500 | — | — | — | — | 97.0 | 97.0 |
| Tetrafluoroethylene resin | 0.5 | 3.0 | — | — | — | — |
| Fluorinated polyether oil | — | — | 0.5 | 3.0 | — | — |
| Silicone oil | — | — | — | — | 3.0 | — |
| Zinc stearate | — | — | — | — | — | 3.0 |
| Measurements | | | | | | |
| Izod impact | 2.7 | 4.6 | 4.6 | 4.0 | 1.6 | 0.9 |

TABLE 2-continued

| No. of comparative example | 5 | 6 | 7 | 8 | 9 | 10 |
|---|---|---|---|---|---|---|
| strength (notch) | | | | | | |
| Bending strength (kg/cm²) | 883 | 1085 | 963 | 948 | 571 | 653 |
| Bending modulus (kg/mm²) | 1250 | 1290 | 1150 | 1380 | 690 | 760 |
| Melt viscosity (kg · cm) | 175 | 83 | 270 | 160 | *55 | *35 |

*Changed to red-brown.

TABLE 3

| No. of comparative example | 11 | 12 | 13 | 14 | 15 | 16 |
|---|---|---|---|---|---|---|
| Composition | | | | | | |
| XYDAR-STR300 | 90.0 | 70.0 | 80.0 | 80.0 | 80.0 | 80.0 |
| Polyether ether ketone | 10.0 | 30.0 | — | — | — | — |
| Polyether imide | — | — | 20.0 | — | — | — |
| Polyether sulfone | — | — | — | 20.0 | — | — |
| Polyphenylene sulfide | — | — | — | — | 20.0 | — |
| Tetrafluoroethylene-perfluoroalkyl vinyl ether copolymer resin | — | — | — | — | — | 20.0 |
| Measurements | | | | | | |
| Izod impact strength (notch) | 3.5 | 1.2 | 2.2 | 1.3 | 1.9 | 3.3 |
| Bending strength (kg/cm²) | 973 | 514 | 733 | 522 | 911 | 712 |
| Bending modulus (kg/mm²) | 1230 | 530 | 970 | 610 | 980 | 960 |
| Melt viscosity (kg · cm) | 215 | 168 | 205 | 185 | 195 | 105 |

What I claim is:

1. All-aromatic polyester resin compositions comprising an all-aromatic polyester resin having three repeated elements of the following formulas as the main structural units:

I

 (n = 0 or 1)
II

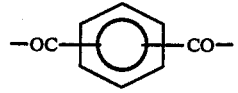
III and a polyether oil.

* * * * *